May 14, 1968     M. C. DE BENNETOT     3,383,141
MAGNETIC SERVOSYSTEM
Filed July 24, 1964
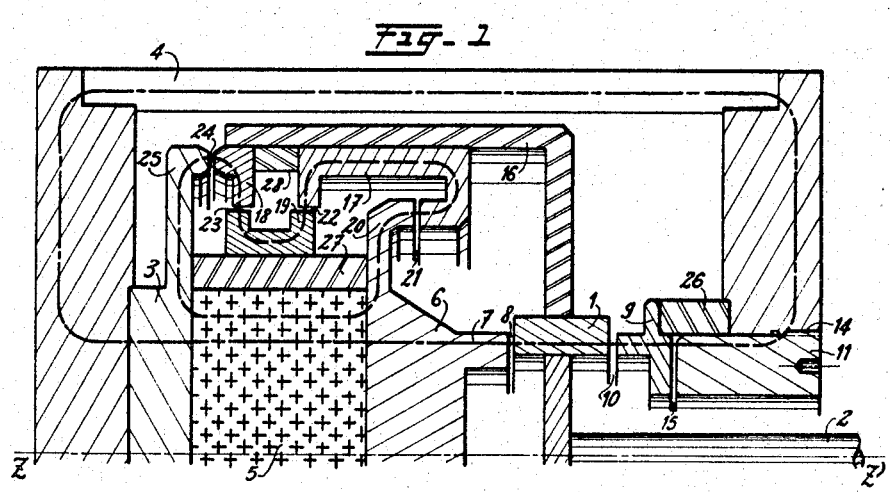
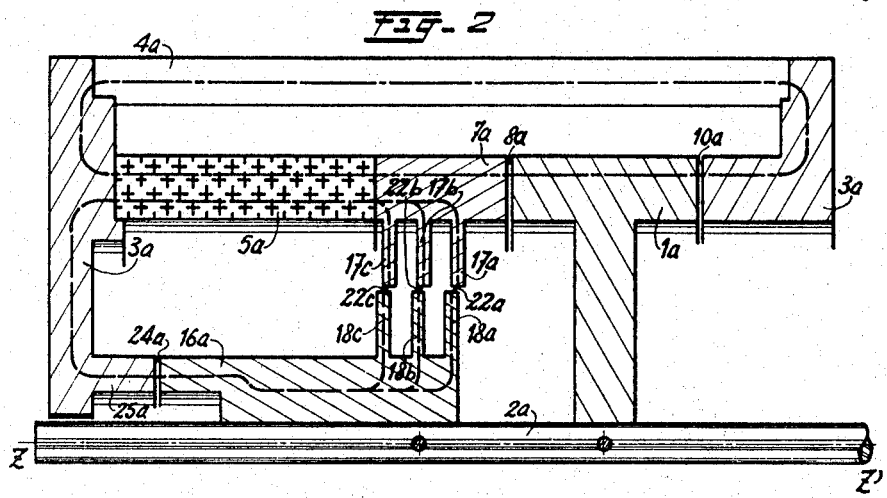
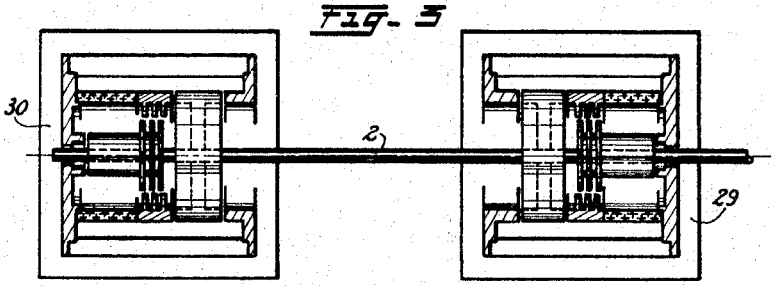

United States Patent Office 3,383,141
Patented May 14, 1968

3,383,141
MAGNETIC SERVOSYSTEM
Michel Cotton de Bennetot, Brest, France, assignor to Société d'Etudes et de Recherches Magnetiques Sermag, Saint-Martin-d'Heres, France, a corporation of France
Filed July 24, 1964, Ser. No. 384,847
Claims priority, application France, July 31, 1963, 943,332, Patent 1,372,560
15 Claims. (Cl. 308—10)

The present invention relates to servosystems adapted for maintaining in a state of equilibrium a magnetic movable member which levitates in a gap of a magnetic circuit.

According to prior art, the magnetic movable member, by properly designing the structure of the magnetic circuit, can be equilibrated either in the "axial" direction, i.e. the direction parallel to the lines of induction in the gap, or in the "radial" direction, i.e. the direction perpendicular to said lines of induction, but not in both directions simultaneously.

It has been attempted to obtain simultaneously radial and axial equilibrium of the movable piece, either through application of particular phenomena such as superconductivity, diamagnetism or with the help of more or less complex servosystems, for instance electromechanical. Until now this has never led to a dependable device which could be used, for instance, as a bearing or a thrust-block, although the interest of such magnetic levitation supporting devices is more and more obvious.

It is an object of the present invention to provide a servosystem which maintains both radial and axial equilibrium of a movable magnetic member which levitates in a gap of a magnetic circuit by means of magnetic attraction forces only and without any supply of energy.

It is yet another object of the invention to provide a magnetic servosystem which is adapted to modify the distribution of the magnetic flux between first and second paths, the first path including a variable gap between fixed and movable magnetic members in such a way that the attraction force which is exerted on said movable member in said gap decreases as the gap decreases.

Yet a further object of this invention is to provide a magnetic levitation supporting device, such as a bearing or a thrust-block, which makes use of the magnetic attraction forces produced by a permanent magnet and does not consume any energy supplied from outside.

According to the invention a magnetic servosystem will include a magnetic movable member, a main stationary magnetic circuit embracing the movable member and defining main air-gaps therewith, a magnetic shunt integrally connected to the movable member and closing on the stationary circuit through auxiliary air-gaps, the magnetic circuit and the shunt being designed in such a way that any displacement of the movable member which varies a main air-gap, has the effect of varying the flux distribution between main and shunt magnetic circuits, enough for causing the attraction of force in said main air-gap to decrease when said main air-gap decreases.

These general objects and advantages and such other benefits as may hereinafter appear or be pointed out, may be achieved in the manner as illustrated in the examples of the accompanying drawing, in which FIG. 1 is a sectional view of a magnetic bearing including a magnetic servosystem according to an embodiment of the invention.

FIG. 2 is a sectional view of a modification; and

FIG. 3 diagrammatically shows a shaft which is journalled in two complementary bearings of the type illustrated in FIG. 2.

The magnetic bearing shown in FIG. 1 or 2 is symmetrical around axis ZZ' and only half of the section is shown.

Referring more particularly now to FIG. 1, said bearing includes a rotor 1 integral with a shaft 2 and a stator 3, integrally connected with a casing 4.

Stator 3 comprises a permanent magnet 5 provided with a yoke 6 having an extension 7. There is an air-gap 8 between yoke 6 and rotor 1.

Stator 3 has a further extension 9 and there is furthermore an air-gap 10 between extension 9 and rotor 1. A yoke 11 is adjustably secured to frame 4 by means, for instance, of a thread 14. There exists a further air-gap 15 between yoke 11 and extension 9.

A magnetic servosystem secured to rotor 1, includes the following parts:

A connecting member 16 of a non-magnetic material, in the illustrative example shown bell-shaped;

Two magnetic members 17 and 18 secured to member 16;

A further magnetic member 19 secured to stator 3.

It is clear that the total magnetic flux produced by permanent magnet 5 will be distributed between a main path which is indicated in the drawing as a line with a long dash and a dot, and an auxiliary or shunt path which is indicated as a dashed line.

The main path passes through yoke 6, pole extension 7, across gap 8, through member 1, across gap 10, through pole extension 9, across gap 15, through yoke 11 and frame 4.

The shunt path passes through a further pole extension 20 of yoke 6, across gap 21, through magnetic member 17, across gap 22, through magnetic member 19, across gap 23, through magnetic member 18, across gap 24 and through pole extension 25 of stator 3.

The servosystem further includes non-magnetic connecting members such as 27 and 28. Shaft 2 is made of a non-magnetic material. Apart from permanent magnet 5, the magnetic parts of the device are made of a soft magnetic material, either metal or ceramic.

When in operation, shaft 2 and rotor 1 revolve around axis ZZ', rotor 1 levitating, i.e. keeping its balance between pole extensions 7 and 9 of the stator without any material contact with any part whatsoever. This state of equilibrium is due, as far as the radial equilibrium of the rotor is concerned, to a radial centering force exerted on it as a result of magnetic attractions in the gaps 8 and 10.

The axial equilibrium of the rotor is due to the action of the servosystem.

Should the servosystem not exist, the rotor obviously could not be in an axial state of equilibrium between pole extensions 7 and 9, since any displacement of the rotor parallel to axis ZZ' into the direction of the pole extension 7 would result in a decrease of gap 8. Since the attraction force in the gap is directly proportioned to the square of the flux (which stays constant in the absence of the servosystem) and inversely proportioned to the square of the gap width, the decreased gap width causes an increase of the attraction force in said gap.

The servosystem has the effect of decreasing the attraction force when the gap decreases. This is obtained through a considerable increase in the proportion of the total flux which follows the shunt path. The magnetic circuits being designed in such a way that the total flux is substantially constant or slightly increased when the gap 8 decreases, the result is that the flux in gap 8 will be considerably decreased.

The decreasing effect on the attraction force of the flux decrease in gap 8 will counterbalance and even overcome the normal increasing effect of the gap decrease and, therefore, the attraction force will be decreased, causing the movable member to come back to its position of equilibrium between the gaps 8 and 10.

In the embodiment illustrated the flux increase in the shunt path is obtained as follows:

The shunt path includes serially connected gaps 21 to 24 which all effectively decrease when the rotor 1 is leftwardly displaced as indicated above. That is, axial gaps 21 and 24 actually decrease in width, while the effective areas of radial gaps 22 and 23 increase, which is the equivalent, as far as their magnetic reluctance is concerned, to a decrease in their widths. The main path, however, includes three serially connected gaps 8–10–15, the sum of which is constant.

Of course, if rotor 1 should be moved from its equilibrium condition so as to increase the width of gap 8, the proportion of the total flux that follows the shunt path through gaps 21 to 24 is decreased, since gaps 21 and 24 are increased in width by the same amount as gap 8. Accordingly, the effective attraction force in gap 8 is increased so that the rotor is returned to its equilibrium condition.

It is remarked that, as part of the shunt magnetic circuit is integrally connected to the rotor, the said shunt circuit should not exert unbalancing forces, either radial or axial, on the rotor.

In the embodiment of FIG. 1 the radial centering forces produced respectively in gaps 21 and 24 on the one hand, and in gaps 22 and 23 on the other hand, will substantially compensate each other mutually. That is, any variation in the radial component of the attraction forces in gaps 21 and 24 is counterbalanced by a variation in the opposite direction of the radial component of the attraction forces in gaps 22 and 23.

Moreover, the total attraction force exerted on the rotor in the axial direction by the servosystem is substantially constant, since the axial attraction force increases in gaps 21 and 24 during the abovementioned displacement, while the axial attraction force decreases in gaps 22 and 23.

From the above discussion results that the servosystem will exert a substantially constant axial attraction force on the rotor and will transmit to the latter no unbalancing forces, either axial or radial.

It is further remarked that due to the cylindrical casing 4 the device is well protected against the influences of any external magnetic field.

The device being homopolar, no substantial eddy current loss is generated therein and the rotation of the rotor does not result in a production of heat which is a very important point when the device is to operate under vacuum. Moreover, no braking effect will be exerted on the rotor.

It is to be emphasised that the device will operate with magnetic inductions as high as several thousand Gauss and to levitate a rotor having a weight of several tens of kilograms.

The attraction force exerted on the rotor will be adjusted by varying, for instance, the position of yoke 11 and, therefore, of gap 15.

It will be observed that, as a modification, one could devise a levitating movable member, the axial equilibrium of which should be obtained through proper designing the magnetic circuits, whereas the radial equilibrium should be obtained with the help of a magnetic servosystem of the type disclosed hereinabove.

In the modified embodiment which is illustrated in FIG. 2 the servosystem includes parts which are similar to those of FIG. 1, namely: rotor 1a, shaft 2a, stator 3a, casing 4a and permanent magnet 5a. The main flux path, shown in a dashed and dotted line, passes through the permanent magnet 5a, pole extension 7a, across gap 8a, through rotor 1a, across gap 10a, through stator 3a and casing 4a.

The shunt path shown in dotted lines, passes through the permanent magnet 5a, three-branch pole extension 17a–17b–17c, which is integrally connected to the stator, across three-fold gap 22a–22b–22c, through three-branch pole extension 18a–18b–18c which is integrally connected to a rotating magnetic member 16a, on its turn secured to shaft 2a, across gap 24a, through pole extension 25a, and stator 3a.

As in the embodiment of FIG. 1 the total flux is substantially constant or slightly increasing when rotor 1a is axially displaced in the direction of pole extension 7a, whereas the proportion of the total flux which follows the shunt path considerably increases. This is due to the fact that the shunt path includes parallel gaps 22a–b–c in series with gap 24a which are all decreasing during the said displacement, whereas the main path includes two gaps 8a and 10a, the sum of which remains constant. It can then be managed in such a way that, in spite of the decrease of gap 8a, the attraction force in said gap decreases during the said displacement and, therefore, the rotor 1a remains in a state of axial equilibrium. Its radial equilibrium is due to the centering effect of the attraction force.

In short, the rotor equilibrium is obtained exactly in the same way as in the embodiment of FIG. 1.

As far as the equilibrium of the shunt circuit, i.e. of member 16a, is concerned, one may consider that the arrangement of FIG. 1 includes a couple of symmetrical gaps: for instance, gap 24a in FIG. 2 corresponds to gaps 21 and 24 of FIG. 1; gap 22a–b–c of FIG. 2 corresponds to gaps 22–23 of FIG. 1.

It results therefrom that the equilibrium of the shunt circuit will only be obtained through combining the bearing of FIG. 2 (denoted as 29, FIG. 3) with another bearing (30, FIG. 3) which will be symmetrical with bearing 29 with respect to a plane perpendicular to shaft 2.

What I claim is:

1. A magnetic levitation system comprising:
    a magnetic member positioned in an equilibrium condition but displaceable therefrom at least in a first direction,
    means for producing magnetic flux,
    stationary magnetic circuit means incorporating said flux producing means and said magnetic member and defining therewith for said flux a first flux path including at least first and second serially connected air gaps, the gap sum of which is maintained substantially constant regardless of displacement of said magnetic member, and
    servomagnetic shunt circuit means integrally connected to said magnetic member and forming for said flux and with said stationary magnetic circuit means a second flux path through at least third and fourth serially connected air gaps so that at least the said third gap has a variable width extending in said first direction for modifying the distribution of flux between said first and second paths when said magnetic member is displaced in said first direction from said equilibrium condition and changes said third air gap while the sum of said first and second air gaps remains constant as aforesaid, to cause the said displacement of said magnetic member to be eliminated.

2. A system as in claim 1 wherein said stationary magnetic circuit means includes an adjustable width air gap serially connected with said first and second air gaps.

3. A system as in claim 1 wherein said flux producing means is a permanent magnet.

4. A system as in claim 1 including shaft means extending in an axial direction for supporting said magnetic member in said equilibrium condition effectively between said first and second gaps the respective widths of which extend in said axial direction.

5. A system as in claim 4 wherein said magnetic member is rotatable by said shaft means.

6. A system as in claim 4 wherein said first direction is a radial direction perpendicular to said axial direction and said third air gap has a width extending in said radial direction so that radial displacement of said magnetic member from said equilibrium condition is eliminated.

7. A system as in claim 4 wherein said first direction is said axial direction and said third air gap has a width extending in said axial direction so that axial displacement of said magnetic member from said equilibrium condition is eliminated.

8. A system as in claim 7 wherein said magnetic member is also displaceable in a radial direction perpendicular to said axial direction and the said fourth air gap has a variable width extending in said radial direction so that radial displacement of said magnetic member from said equilibrium condition is eliminated.

9. A system as in claim 8 wherein said stationary and servomagnetic circuit means forms fifth and sixth serially connected air gaps in said second flux path serially connected with said third and fourth air gaps and respectively having variable widths in the said axial and radial directions.

10. A system as in claim 8 wherein said stationary and servomagnetic circuit means forms in said second flux path fifth and sixth air gaps connected in parallel with said fourth air gap and having variable widths in the said radial direction.

11. A magnetic levitation device comprising:
shaft means extending in an axial direction,
rotor means secured to said shaft means for rotation therewith and having at least a magnetic portion,
stationary magnetic circuit means incorporating a permanent magnet for creating magnetic flux and including said magnetic rotor portion with first and second air gaps on opposite sides thereof in a first flux path,
said first and second air gaps having widths extending in said axial direction, and
servomagnetic shunt circuit means integrally connected to said rotor means but magnetically insulated from said magnetic portion thereof and forming with said stationary magnetic circuit means a second flux path including at least third and fourth serially connected air gaps between said stationary and shunt circuit means, with at least the said third gap having a width varying in said axial direction upon displacement of said magnetic rotor portion from an equilibrium position between said first and second air gaps, while the axial width of said first and second gaps remains constant, in order to modify the distribution of flux between said first and second paths and thereby return the magnetic rotor portion to said equilibrium position,
said fourth air gap having a width which varies in a radial direction, which is perpendicular to said axial direction, when said magnetic rotor portion is displaced radially from said equilibrium position, to modify the distribution of flux between said first and second paths and thereby cause the said magnetic rotor portion to be returned to its said equilibrium position.

12. A device as in claim 11 wherein said stationary magnetic circuit means includes a cylindrical outer casing for protecting the system from external magnetic fields.

13. A device as in claim 11 wherein said first flux path surrounds said second flux path.

14. A device as in claim 11 including an adjustable width air gap in one of said flux paths for regulating the relative amount of flux in said paths when the magnetic rotor portion is in its equilibrium position.

15. A magnetic levitation system comprising two devices each as in claim 11 sharing the same said shaft means.

References Cited
UNITED STATES PATENTS 2,725,266 11/1955 Mendelsohn _____ 308—10
2,747,944 5/1956 Baermann _____ 308—10

MILTON O. HIRSHFIELD, *Primary Examiner.*

L. L. SMITH, *Assistant Examiner.*